United States Patent
Krawczyk et al.

(10) Patent No.: US 6,874,981 B1
(45) Date of Patent: Apr. 5, 2005

(54) BEVERAGE TRANSPORT CART SYSTEM AND METHOD OF ITS MANUFACTURE AND OPERATION

(76) Inventors: Joseph D. Krawczyk, 5801 S. Melita Rd., Pinconning, MI (US) 48650; Robert W. Grace, 1882 E. Highland Rd., Twinsbury, OH (US) 44087; Norman C. Strohfus, 2750 Eagandale Blvd., Eagan, MN (US) 55121; David J. Glancy, 1881 E. Highland Rd., Twinsbury, OH (US) 44087

( * ) Notice: Subject to any disclaimer, the term of this patent is extended or adjusted under 35 U.S.C. 154(b) by 0 days.

(21) Appl. No.: 09/889,525
(22) PCT Filed: Jan. 10, 2000
(86) PCT No.: PCT/US00/00541
§ 371 (c)(1), (2), (4) Date: Sep. 19, 2001
(87) PCT Pub. No.: WO00/43234
PCT Pub. Date: Jul. 27, 2000

Related U.S. Application Data
(60) Provisional application No. 60/116,473, filed on Jan. 20, 1999.

(51) Int. Cl.[7] .................................................. B60P 7/08
(52) U.S. Cl. .............................. 410/66; 410/67; 410/77
(58) Field of Search .............................. 410/66, 67, 77, 410/80, 121; 280/47.34, 47.35, 79.11, 79.2, 79.3, 651

(56) References Cited

U.S. PATENT DOCUMENTS

| | | | | |
|---|---|---|---|---|
| 2,950,126 A | * | 8/1960 | Armentrout | 410/66 |
| 3,057,489 A | * | 10/1962 | Gilliam, Jr. | |
| 3,891,102 A | * | 6/1975 | Blount | |
| 3,984,117 A | * | 10/1976 | Bates et al. | 410/66 |
| 4,056,066 A | * | 11/1977 | Homanick | 410/66 |
| 4,084,714 A | * | 4/1978 | Williams | |
| 4,120,076 A | * | 10/1978 | Lebre | |
| 4,948,154 A | * | 8/1990 | Guggenheim | |
| 5,562,374 A | * | 10/1996 | Plamper | 410/66 |
| 5,673,984 A | * | 10/1997 | Insalaco et al. | |
| 6,099,220 A | * | 8/2000 | Poth | 410/94 |
| 6,299,184 B1 | * | 10/2001 | Krawczyk | |
| 6,520,515 B2 | * | 2/2003 | Krawczyk | |

\* cited by examiner

*Primary Examiner*—Stephen T. Gordon
(74) *Attorney, Agent, or Firm*—Reising, Ethington, Barnes, Kisselle & Learman, P.C.

(57) ABSTRACT

A series of transport carts are positioned in side by side relation in fore and aft extending spaced apart rows disposed along a delivery van to leave an aisle between them. The carts have wheel supported upright frames with bottom supports for the products disposed at a level above the floor of the van and open fronts from which the carts can be unloaded. The carts have rear posts which are disengageably locked in track sections provided in longitudinally spaced relation along the van side walls. Pallets with discs projecting downwardly from the floors of the pallets support the product stacks on the cart bottom supports. A hand truck with a bifurcated nose plate defining disc receiving arms engages under each pallet to enable removal of a pallet and product stack from the cart.

7 Claims, 16 Drawing Sheets

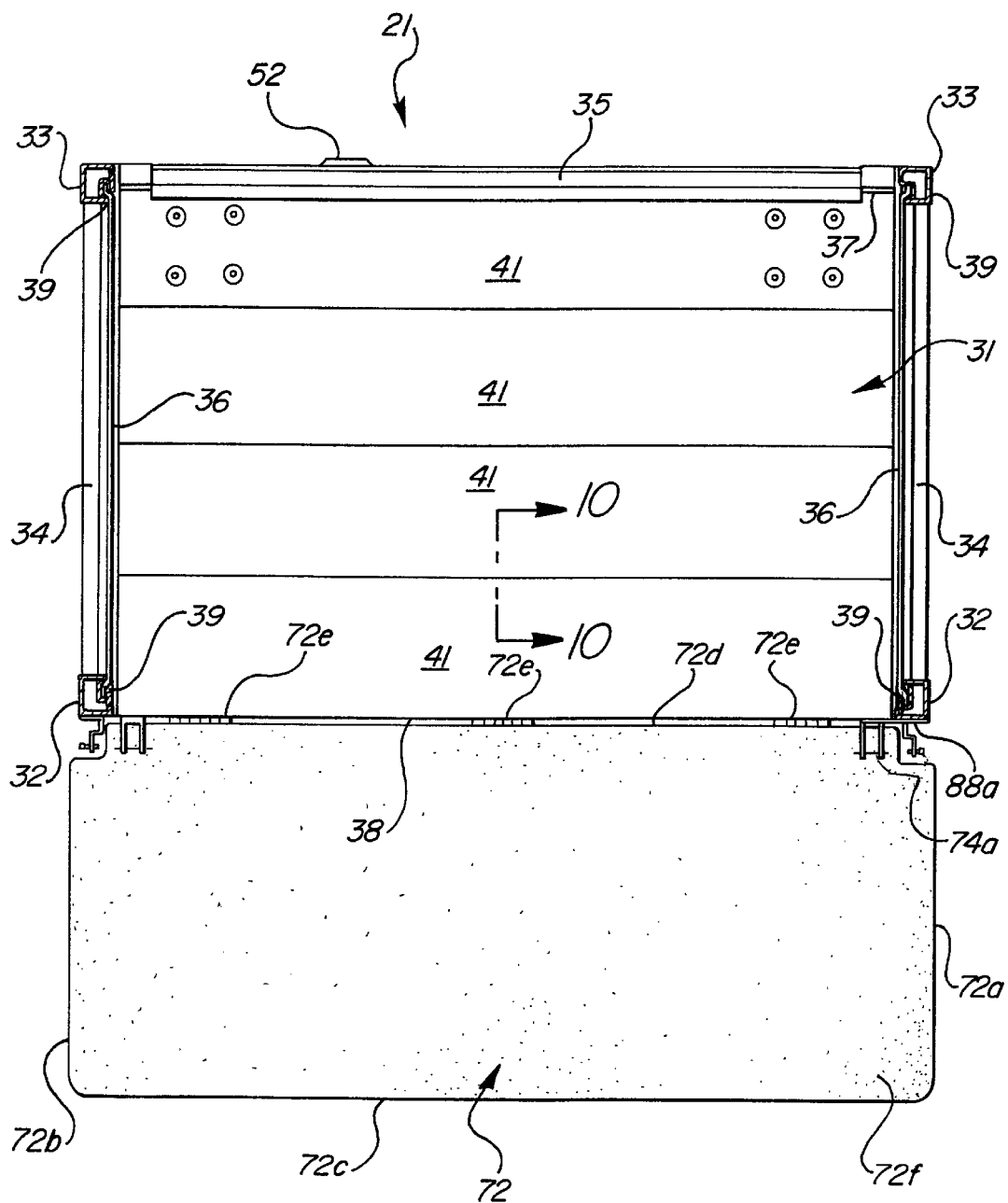

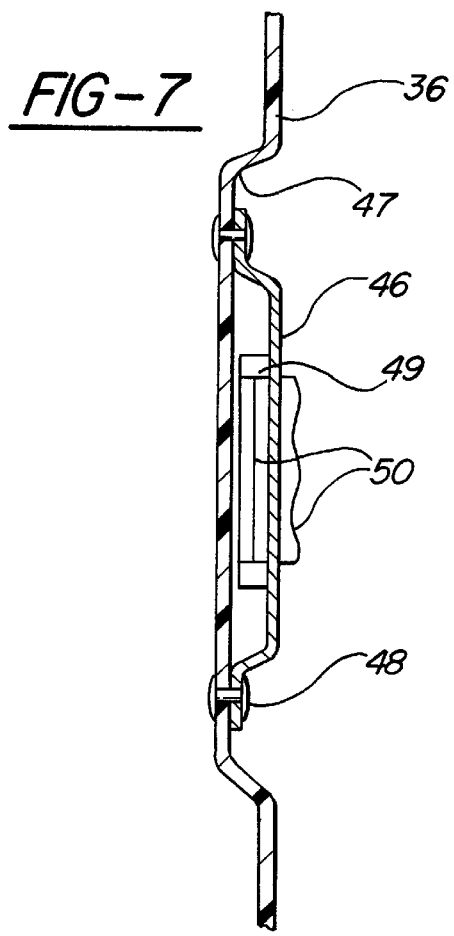
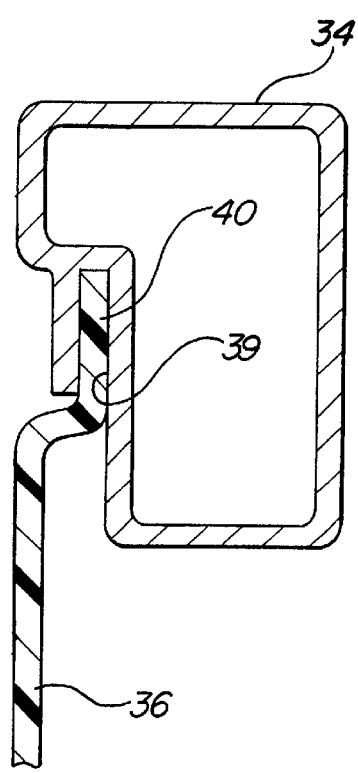

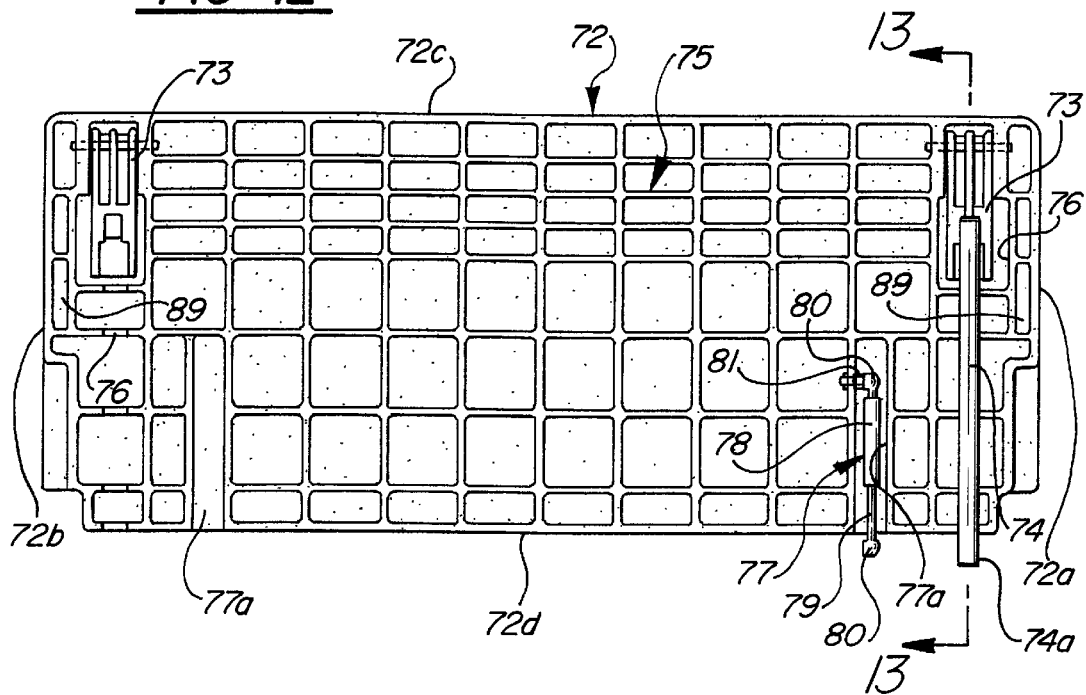
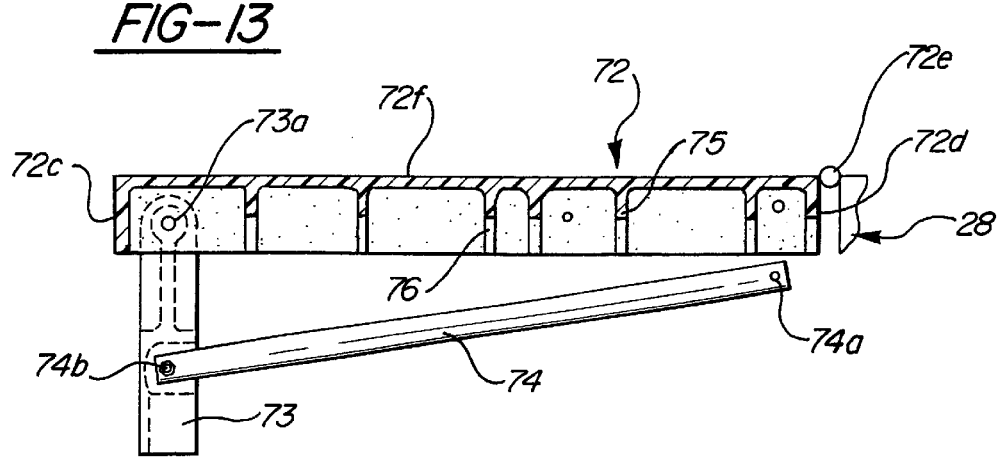

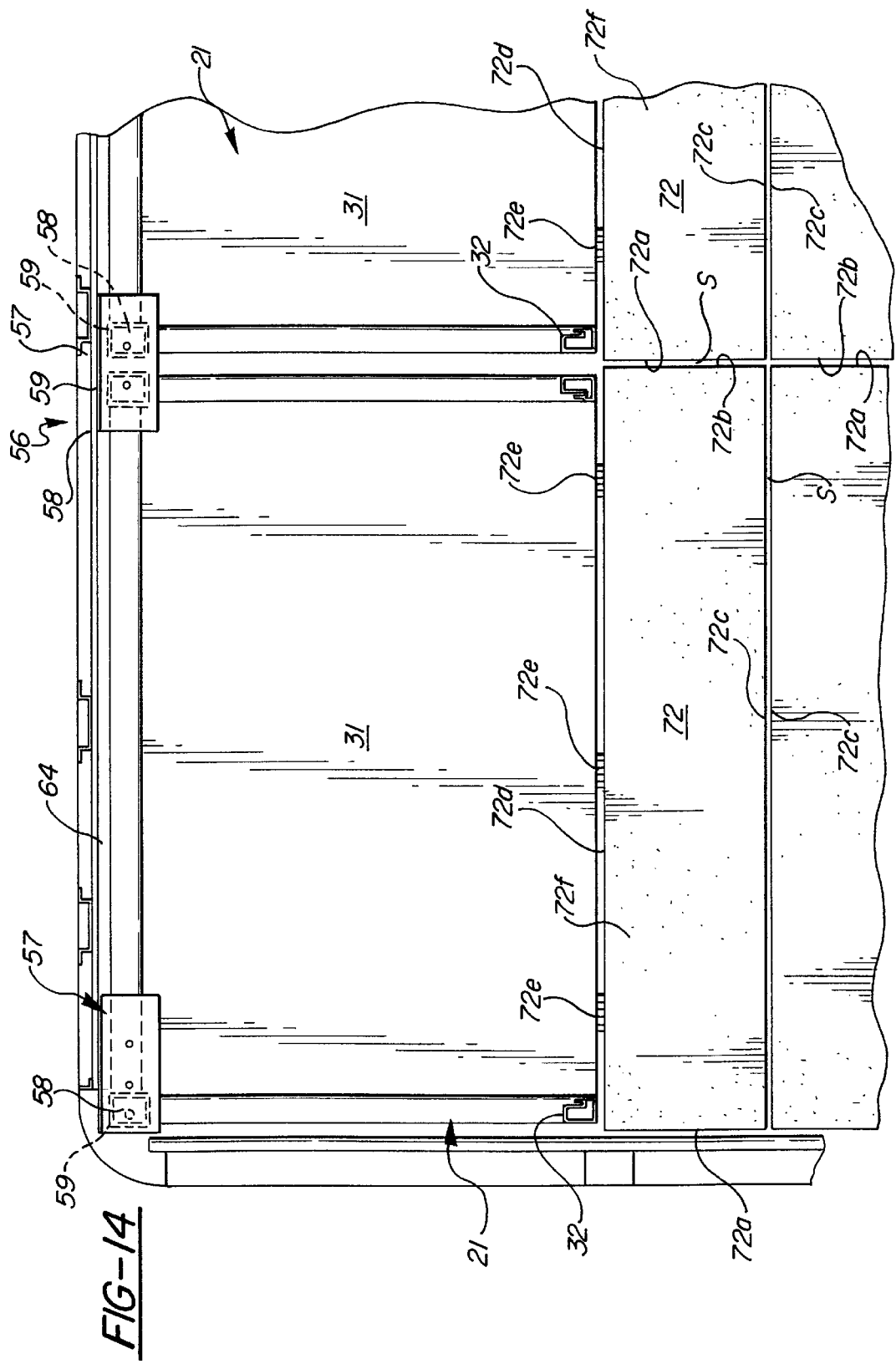

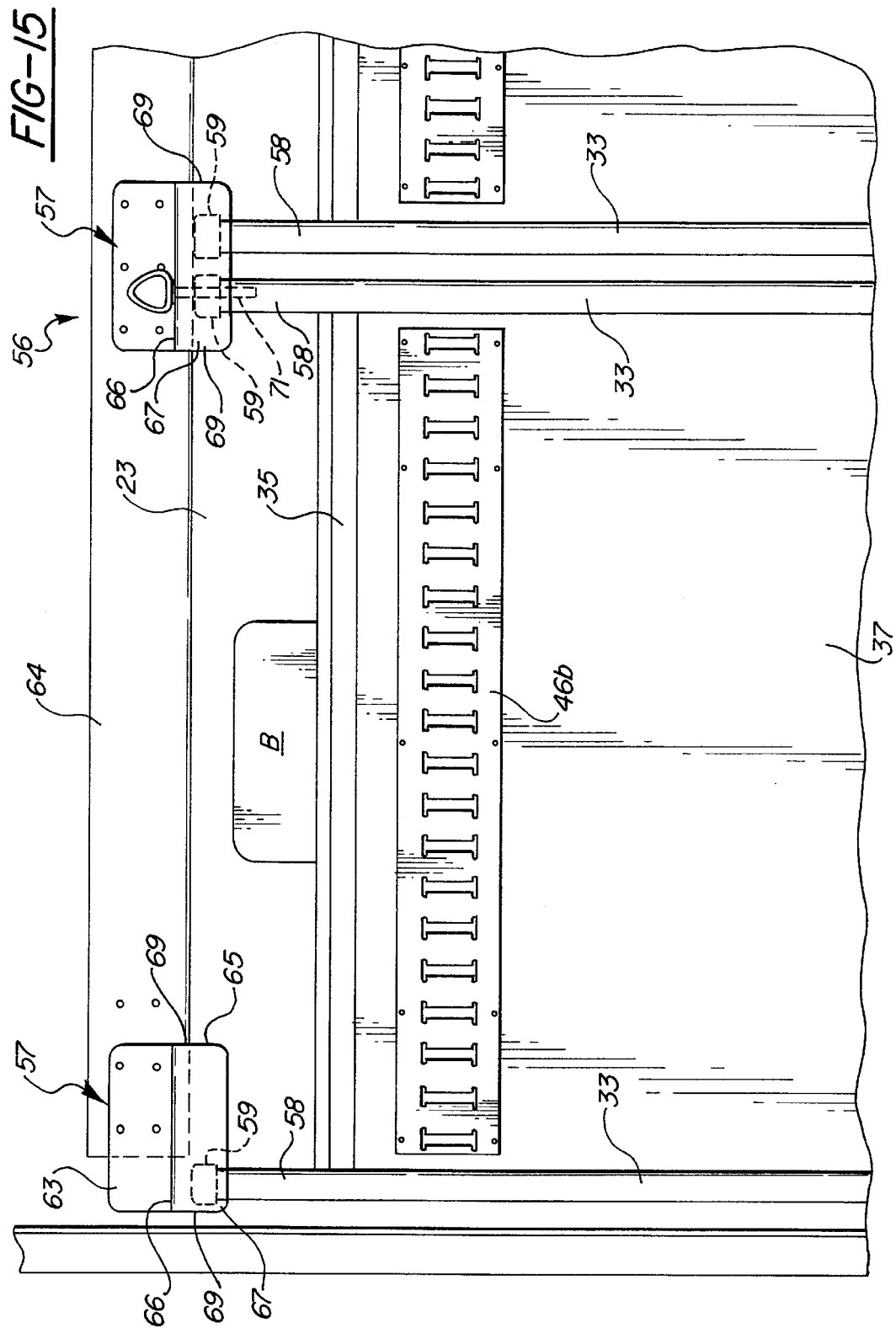

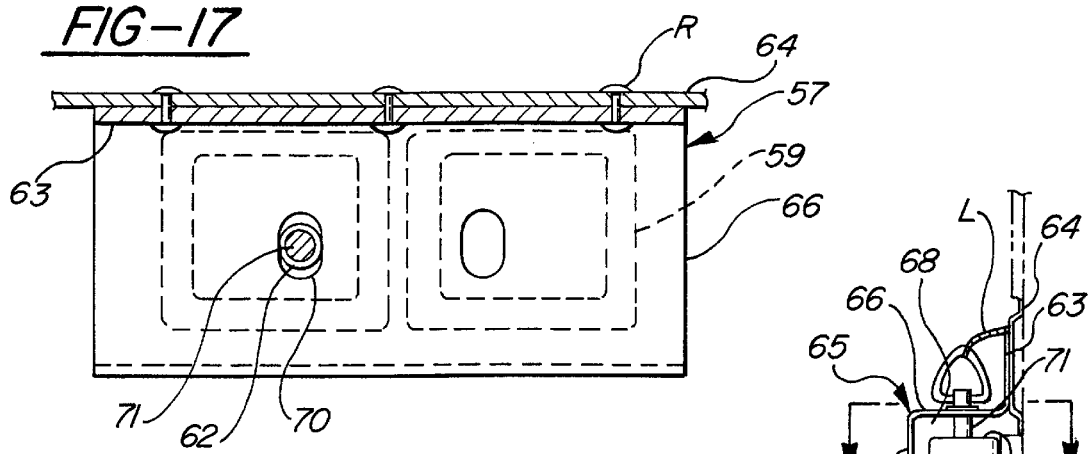
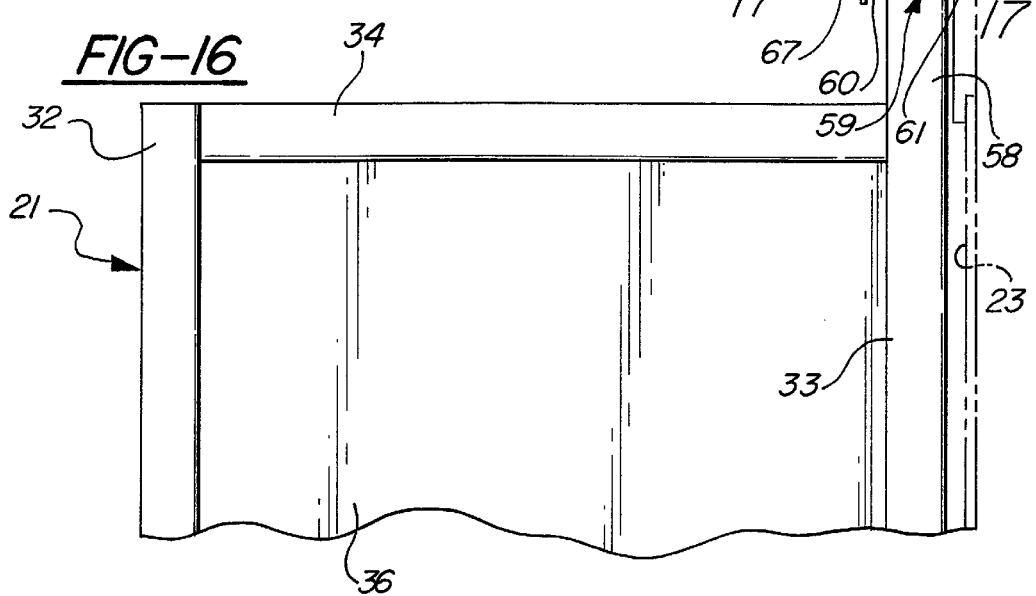
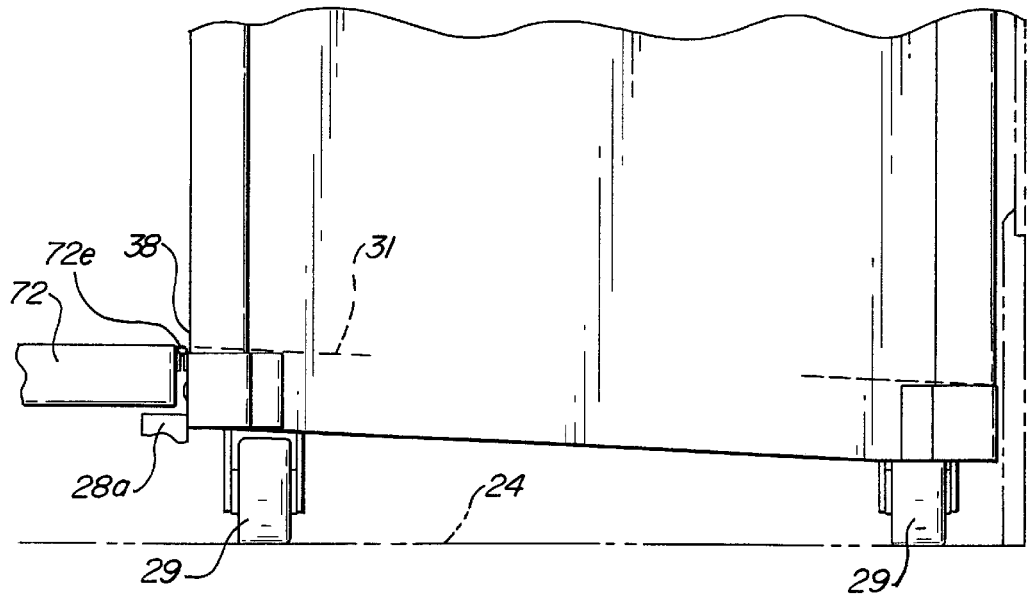

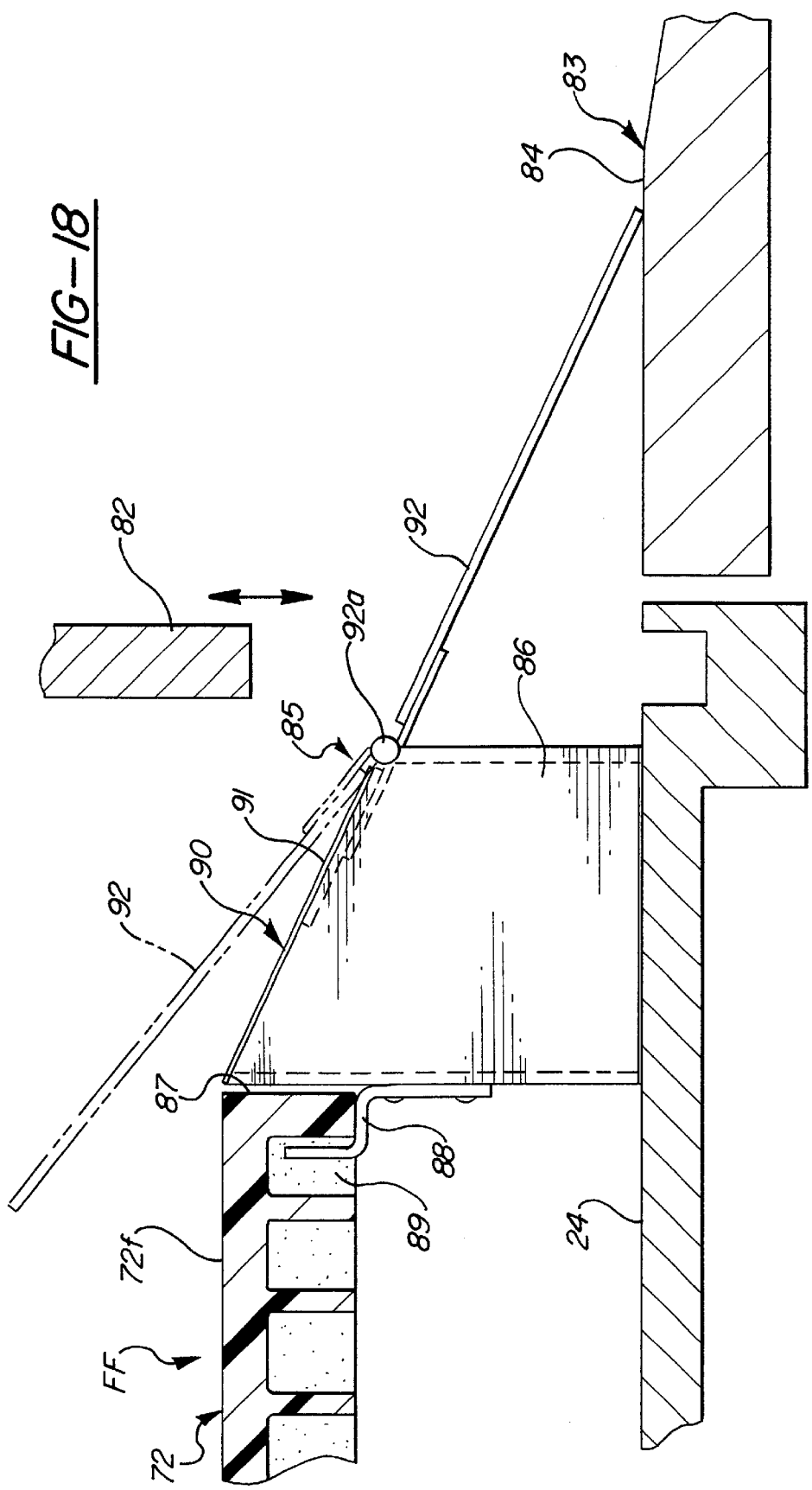

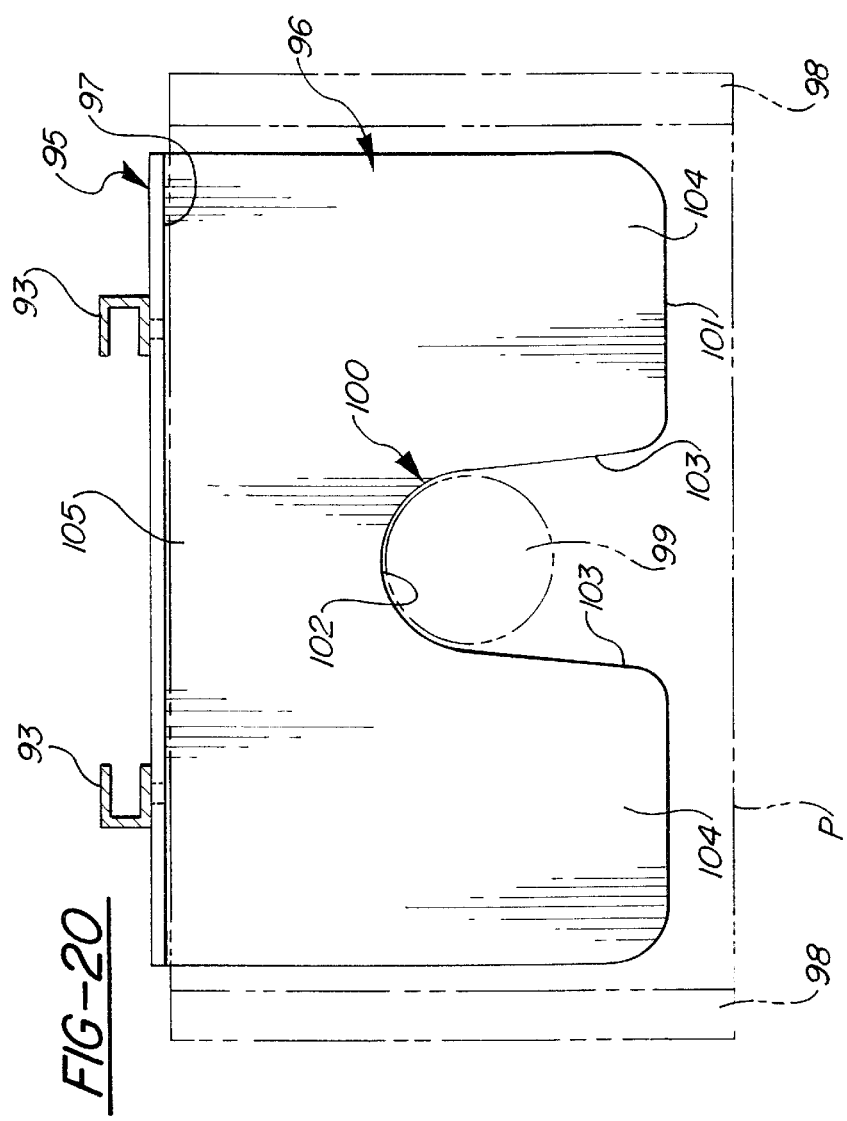
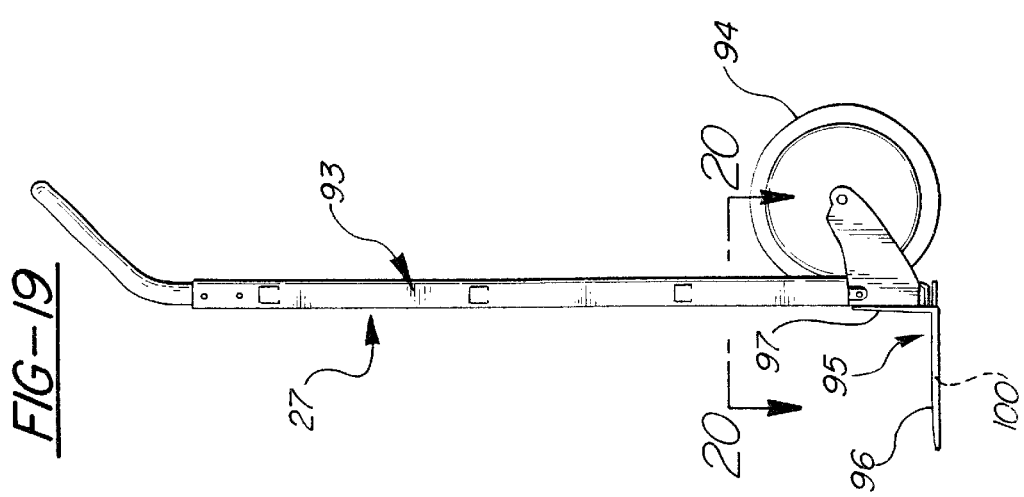

BEVERAGE TRANSPORT CART SYSTEM AND METHOD OF ITS MANUFACTURE AND OPERATION

This invention is entitled to the priority of U.S. provisional application Ser. No. 60/116,473, filed Jan. 20, 1999, and relates generally to the manufacture and handling of carts carrying products such as stacked cases of beverage containers for transport in a delivery vehicle. Typically, the vehicle will move the preloaded carts from a manufacturing facility or distribution center to a retailer.

BACKGROUND OF THE INVENTION

The system which is presently commonly used to handle and transport cases of beverage containers, for example, from a manufacturing and/or distributing center to a retailer, such as a grocery store, convenience store, etc. is inherently a laborious, time-consuming operation requiring numerous delivery vehicles and operators, each covering a rather limited region. The traditional system involves stacking large numbers of a given brand of containers onto large pallets at a distribution center, which are loaded into the exterior bay wells of specially designed delivery trucks.

Upon arrival at a retail site, the operator fills the particular order by selecting the particular brand and quantity of containers from the various bays and unloading them by hand onto a hand truck or wheeled dolly for transport into the facility of the retailer. It takes considerable time to fill an order in this manner, inasmuch as it requires an operator to select the appropriate brand and quantity of containers called for by the order, and then to physically remove the various containers from the bays, restack them onto the hand truck or dolly, and transport the containers from the delivery truck into the retail facility.

A principal object of the present invention is to provide a more efficient system for getting products from the point of manufacture or distribution to the retailer.

SUMMARY OF THE INVENTION

A transport and delivery system constructed and operated according to the invention utilizes a series of wheeled carts having upstanding back and side retention members or walls, which have been loaded at a manufacturing and/or distribution facility with stacks of containers advantageously pre-sorted by brand and quantity according to the orders to be filled. These stacks are preferably built on mini-pallets such that a given cart may be loaded with one or several (four for example) of such mini-stacks.

The location of each pre-filled order is recorded as to which cart or carts are involved, and as to the particular location of the stack or stacks within the carts. For example, a given order might be contained in cart No. 4, stacks 1–3. Once filled with product, the carts are wheeled into an elongate delivery van or trailer of conventional manufacture and secured in a position in which the carts line the opposite walls of the trailer in two laterally spaced rows leaving a center aisle down the middle of the trailer wide enough to access the carts with a two-wheeled hand truck. Longitudinally spaced, open-ended track sections provided along the interior side walls of the van at appropriate intervals capture rear posts on the carts, and interlocks associated with the track sections and cart posts disengageably lock the carts in position.

The cart floors are supported above the level of the floor of the trailer on wheels or other appropriate motive supports. A false floor may be provided along the aisle to elevate the walkway to the level of the cart floors, so that an operator, using a two-wheeled hand truck of special design, is enabled to access the mini-stacks in the carts with the hand truck. The pallets are provided with piloting discs which project from the bottoms of the pallets and the two-wheeled hand trucks have nose plates which are bifurcated at their front ends to define disc embracing load receiving arms positioned forwardly of a load receiving plate portion.

According to the operation of the system, the carts, once loaded into and locked in the trailer, are transported along with the hand truck from the manufacturing and/or distribution center to the various retail delivery sites. Since the orders for each site are pre-built according to the type and quantity of the various brands of beverages or other products, the operator need only locate the order, remove the mini-stack(s) of containers from the cart(s) with the hand truck, and wheel the load(s) along to the elevated lift gate, which is then lowered to the ground to enable the operator to wheel the order into the facility of the business receiving them. When the deliveries are completed, the emptied trailer is returned to the distribution center, and the empty carts are unlocked and removed from the trailer. The trailer can then be loaded with a waiting set of carts pre-loaded with additional orders, and the off-loaded emptied carts can be recycled to handle future orders.

Considerable labor and time is saved with this system, enabling delivery personnel to service a greater number of retail customers in a given region, complete their routes in less time, and service expanded territories.

THE DRAWINGS

A presently preferred embodiment of the invention is disclosed in the following description and in the accompanying drawings, wherein:

FIG. 6 is a top plan view of the cart of FIG. 3;

FIG. 7 is an enlarged fragmentary sectional view taken generally along lines 7—7 of FIG. 3;

FIG. 8 is an enlarged fragmentary cross-sectional view of a portion of the cart, taken generally along lines 8—8 of FIG. 5;

FIG. 12 is a bottom plan view of the deck of the cart of FIG. 3;

FIG. 13 is an enlarged cross-sectional view taken generally along lines 13—13 of FIG. 12;

FIG. 14 is an enlarged fragmentary plan view showing details of the cart lock system;

FIG. 15 is an enlarged fragmentary front elevational view showing details of the cart locking system;

FIG. 16 is a fragmentary side elevational view showing details of the cart locking system;

FIG. 17 is an enlarged fragmentary cross-sectional plan view taken generally along lines 17—17 of FIG. 16;

FIG. 18 is an enlarged fragmentary elevational view of an accompanying ramp constructed according to the invention;

FIG. 19 is a side elevational view of a hand truck having a nose plate constructed according to the present invention;

FIG. 20 is an enlarged fragmentary sectional plan view taken generally along lines 20—20 of FIG. 19.

DETAILED DESCRIPTION

Figure 1:
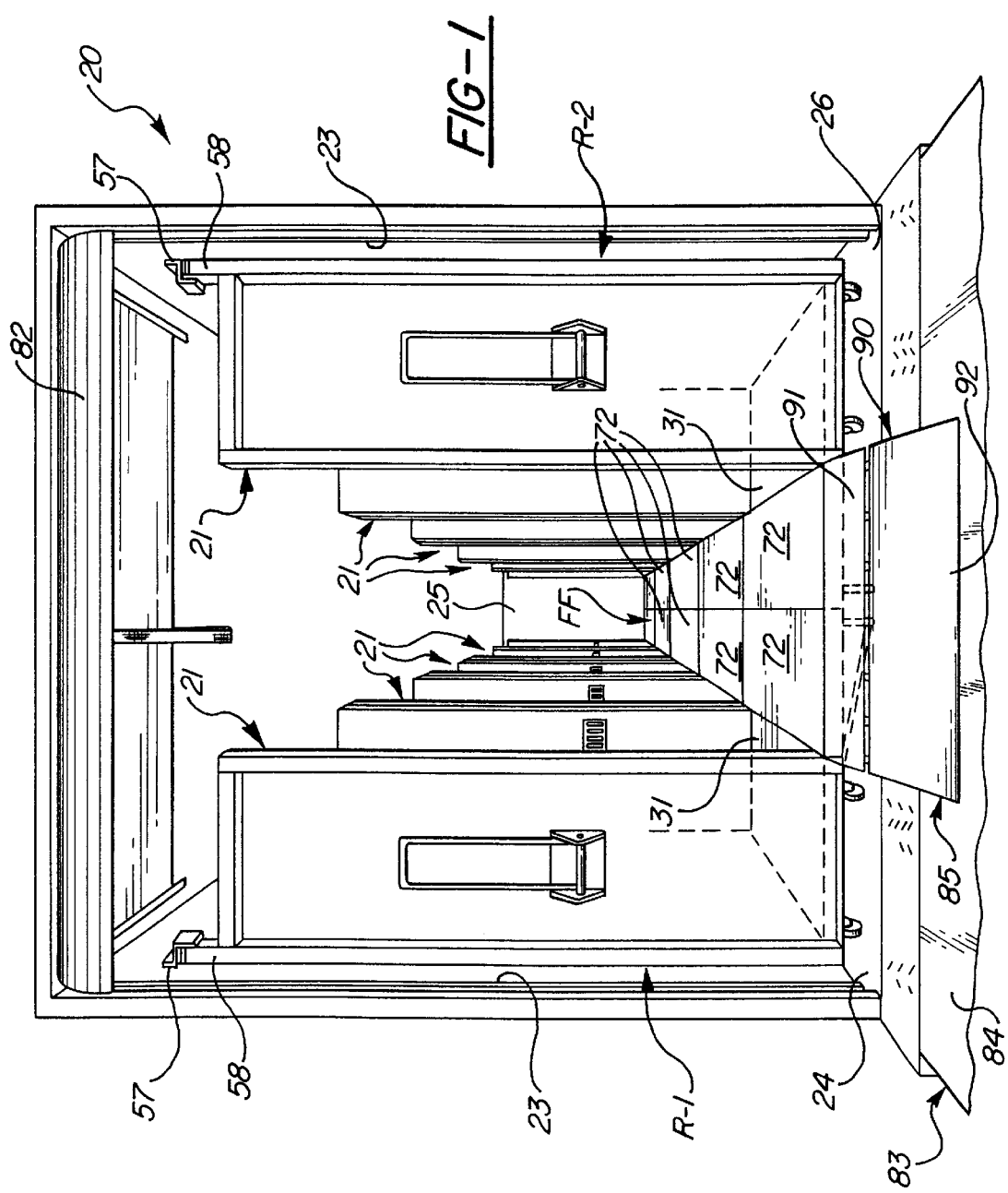
FIG. 1 is a schematic perspective rear elevational view of a transport system constructed according to the invention.
Figure 2:
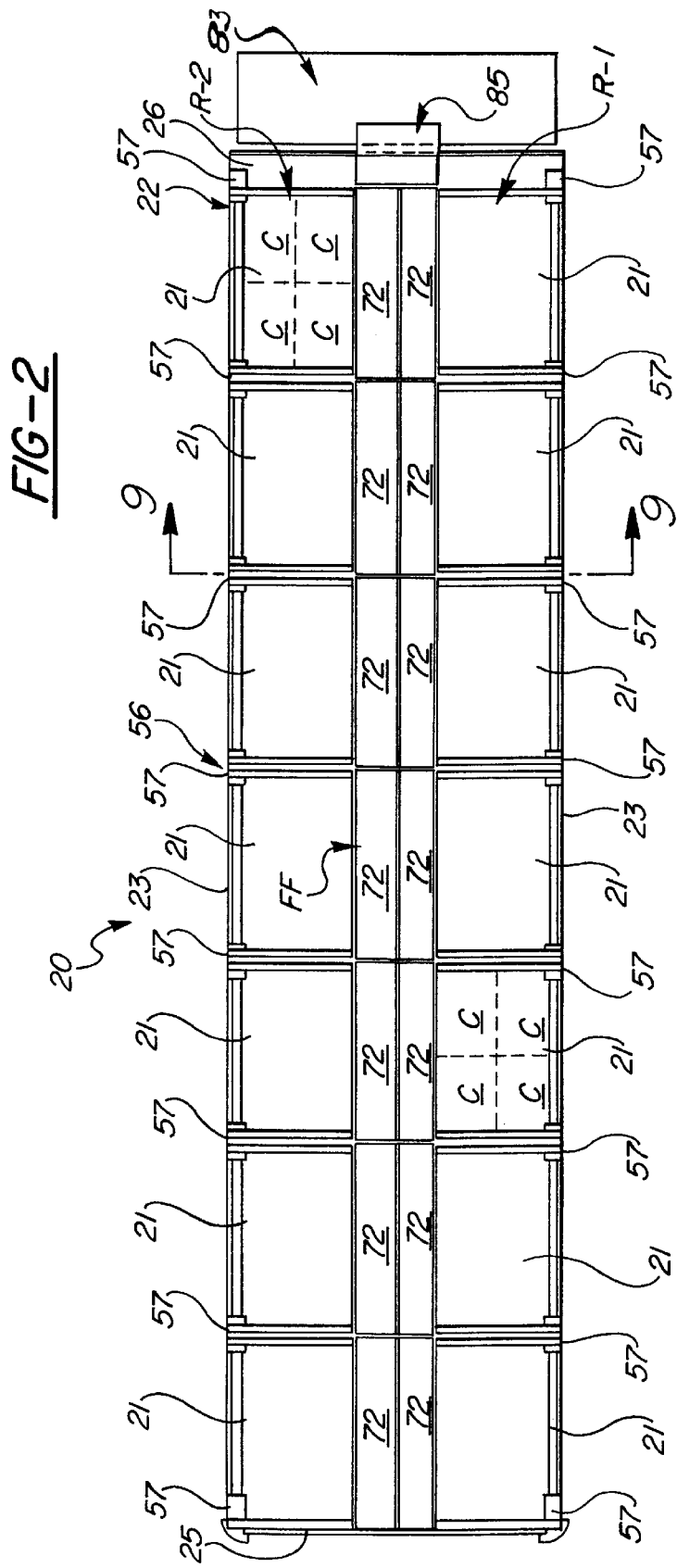
FIG. 2 is a diagrammatic top plan view schematically illustrating the positioning of the carts within the trailer.

A product support and delivery system constructed according to the present invention is shown generally at 20 in FIGS. 1 and 2 and comprises a plurality of wheeled modules or carts 21, positionable within a van trailer 22 along opposite side walls 23 thereof on a floor 24 of the trailer 22 in longitudinally extending rows $R_1$, $R_2$ which extend from a front wall 25 of the trailer 22 toward the back 26 thereof. Space is provided between the adjacent rows $R_1$, $R_2$, defining a center aisle A for accommodating the passage of a hand truck 27 (FIG. 19) used by an operator to remove multiple mini-stacks of palleted containers C from the carts 21 for transport to a retail sales facility.

Turning now to the construction of the cart 21, and with reference to FIGS. 3–15, and initially to FIGS. 3–8, the identical carts 21 each include a rigid frame structure provided by a rectangular base frame 28 mounting a set of four caster wheels 29, one of which is lockable via a lock pin mechanism 30 (FIG. 5) to preclude normal movement of the cart 21 when locked. A floor or product support member 31 on the cart 21 is carried by the base frame 28 to provide a surface above the van floor on which the stacked containers C are supported. A set of front 32 and back 33 vertical corner rails are fixed at their lower ends to the corners of the base frame 28 and extend upwardly therefrom. They are interconnected along three sides adjacent their upper ends by upper side 34 and back 35 cross rails.

Each cart 21 is closed on three of its sides and incorporates a pair of side panels 36 and a back panel 37. The front 38 of the cart 21 is open to permit loading and unloading of the stacked containers C (FIG. 5) from the cart 21. The side and back panels 36, 37 are secured to the framing of the cart and may be fabricated from any of a number of tough, generally rigid materials, such as aluminum plating or synthetic plastic sheets. The panels 36, 37 are preferably molded organic polymeric structures fabricated from materials such as a heavy gauge thermoformed polypropylene or polyethylene, engineered plastics, or the like, to provide lightweight, durable, corrosion resistant, readily cleanable walls for the cart 21. FIG. 8 illustrates the preferred manner of securing the panels 36, 37 to the rails 32–35 and base 28. The rails 32–35 are preferably formed as extrusions and include a channel or groove 39 in which a peripheral tongue 40 on the panels 36, 37 is received, such that the panels 36, 37 are captured and permanently retained by the base 28 and rails 32–35 without need for fasteners.

Figure 5:
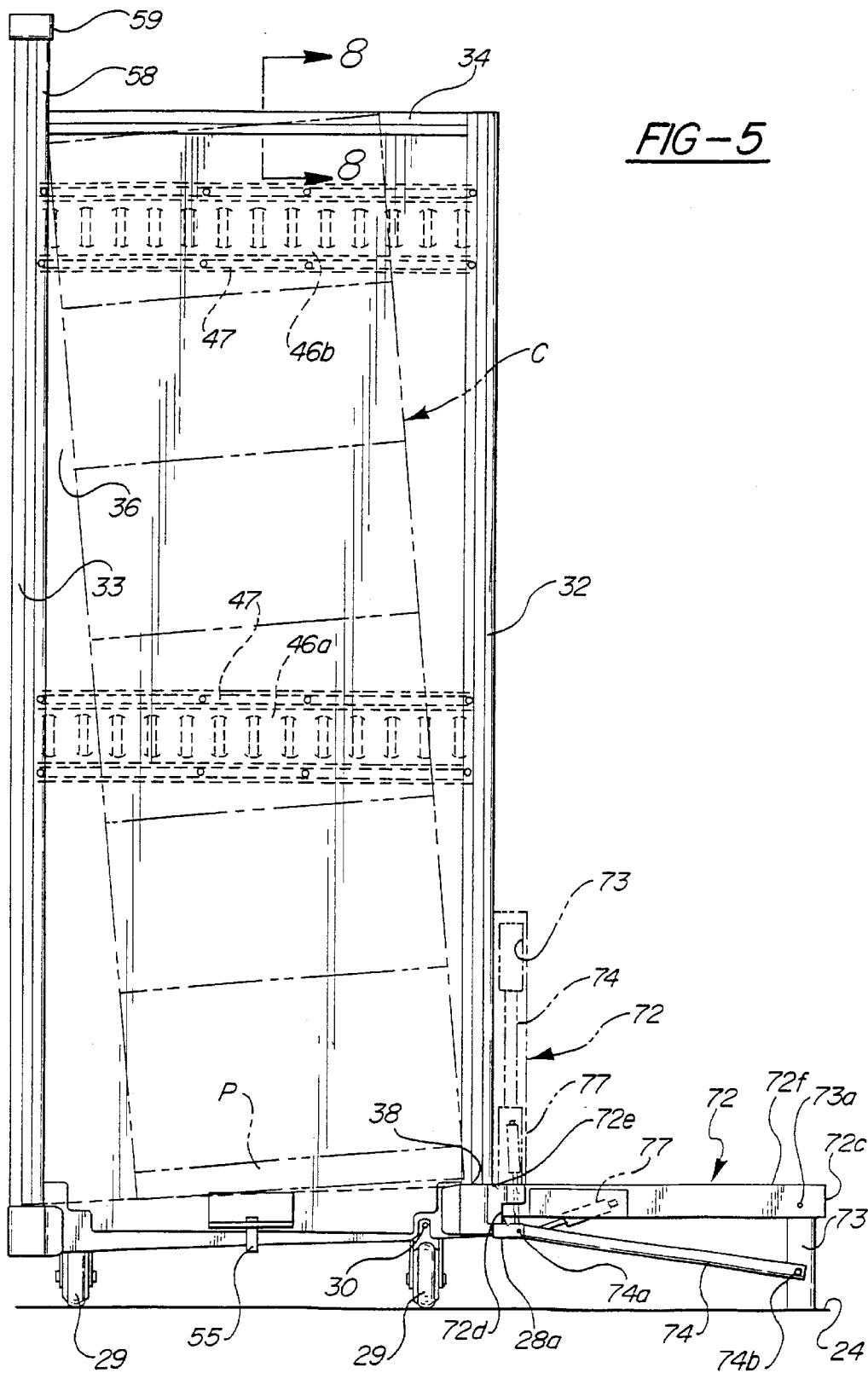
FIG. 5 is an elevational view of the opposite trailing side of the cart of FIG. 3.

The floor 31 of the cart 21 is preferably angled so as to tilt downwardly from the front 38 toward the back 37 of the cart 21 at an angle of about 3 to 5°. The slight angle of the floor 31 serves to tilt the stacks of containers C inwardly of the carts 21 away from the aisle A to stabilize the load during transport, as illustrated in FIG. 5.

Figure 10:
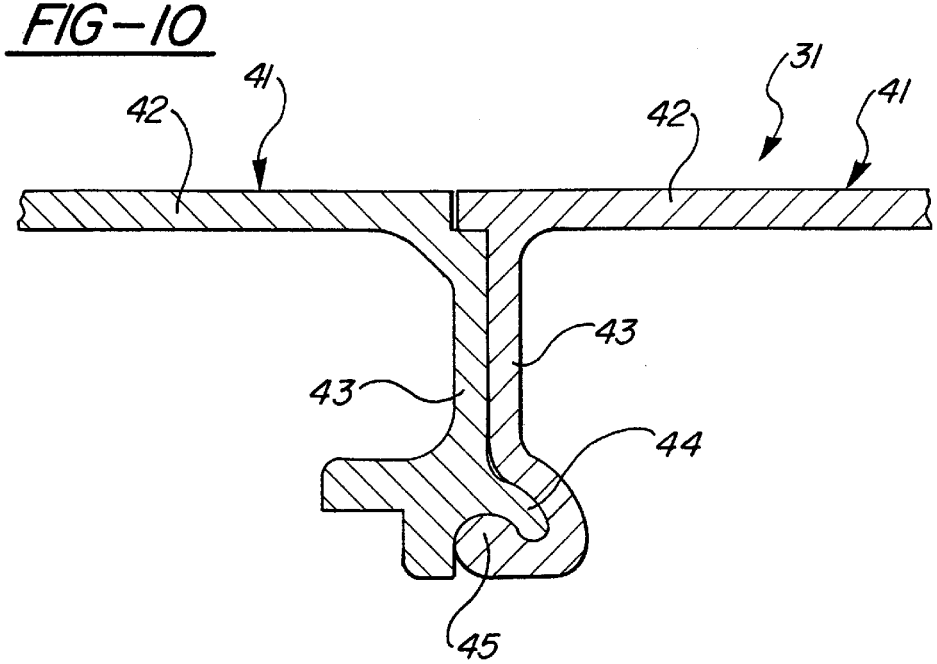
FIG. 10 is an enlarged fragmentary cross-sectional view taken generally along lines 10—10 of FIG. 6.

Referring to FIGS. 6 and 10, the floors or bottom supports 31 of the carts 21 are preferably fabricated from a series of elongate floor sections 41, each having a flat load-supporting upper wall 42 and underlying beam formations 43 along their edges. The beams 43 of adjacent panels have interlocking portions 44, 45 (FIG. 10) that, when interfitted, join the panels 41 to provide a continuous reinforced floor surface 31 which is secured to the base frame 28, such as by welding or with mechanical fasteners. The interior space of each cart 21 is sized to accommodate multiple, and preferably four, mini-stacks of the containers C, each supported on an associated mini-pallet P, as illustrated diagrammatically in FIG. 5.

Two rows of commercially available E-track 46a, 46b extend horizontally along and are secured to the interior surface of the side 36 and back 37 panels. One row 46a is located about midway up the panels 36, 37, and an upper row 46b is located adjacent the upper ends of the panels 36, 37. The E-track 46 is accommodated within recesses or channels 47 formed in the panels 36, 37, as illustrated in FIG. 7, such that the face of the E-track 46 lies generally flush with the inner surface of the panels 36, 37. The E-track sections 46 may be joined to the panels 36, 37 by means of rivets 48 or the like extending through openings 48a. The tracks 46 have a series of punched out openings 49 that receive angular end hooks or clips 50 (FIG. 11) secured to the opposite side edges of a retaining tarp or curtain 51. The tarp 51 can be removed from the stowed position shown and, as illustrated diagrammatically in broken lines in FIG. 11, the tarp 51 is operative to wrap about a partial load to assist in securing the stack of containers from tipping forwardly out of the carts 21 during transport. The full extension of the E-track 46 across the side 36 and back 37 panels enables the tarp 51 to secure virtually any size load. The general use of an E-track 46 and curtain 51 securement system is known, per se, for retaining cargo in a trailer.

Figure 3:
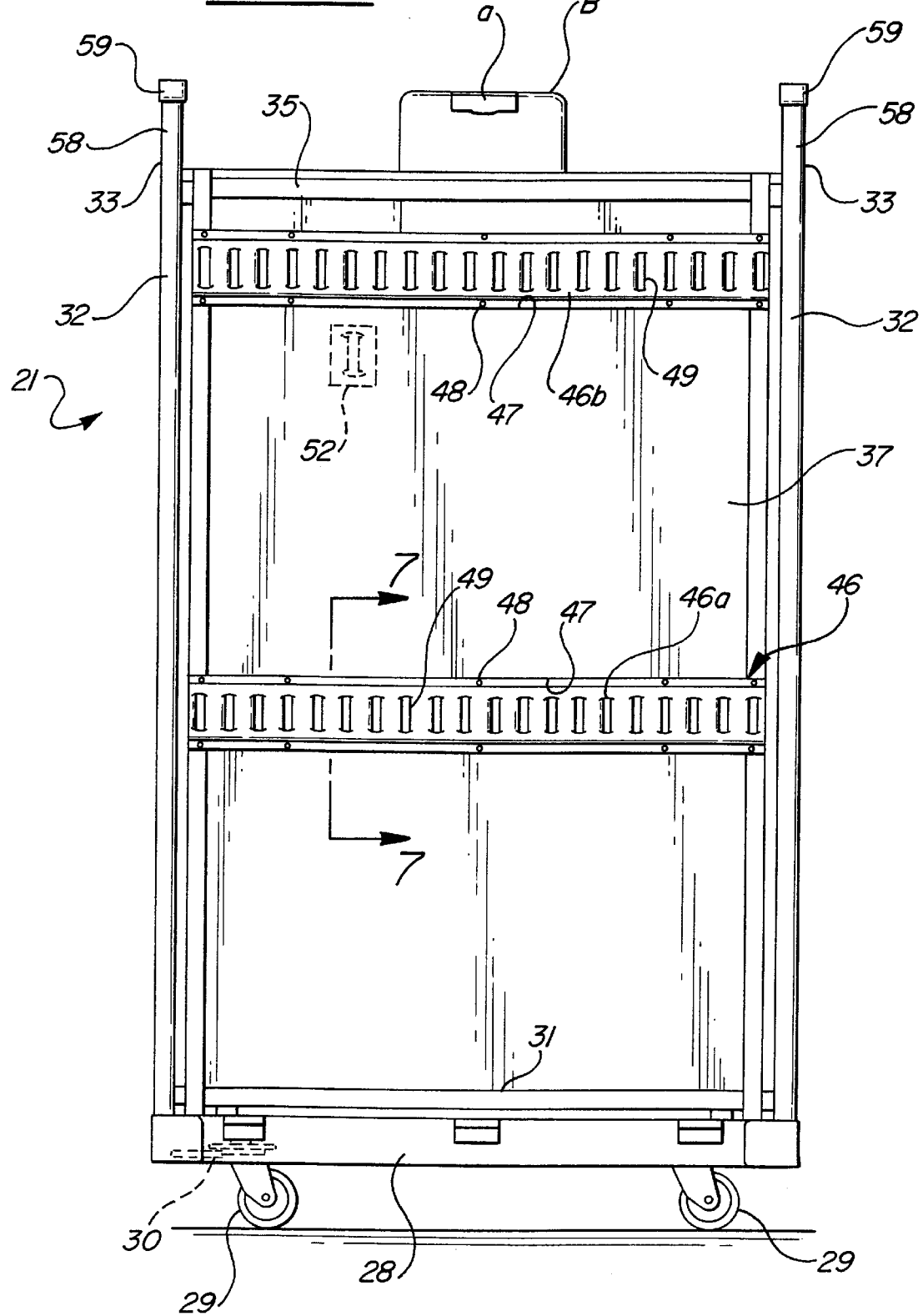
FIG. 3 is a front elevational view of a transport cart constructed according to a presently preferred embodiment of the invention.
Figure 11:
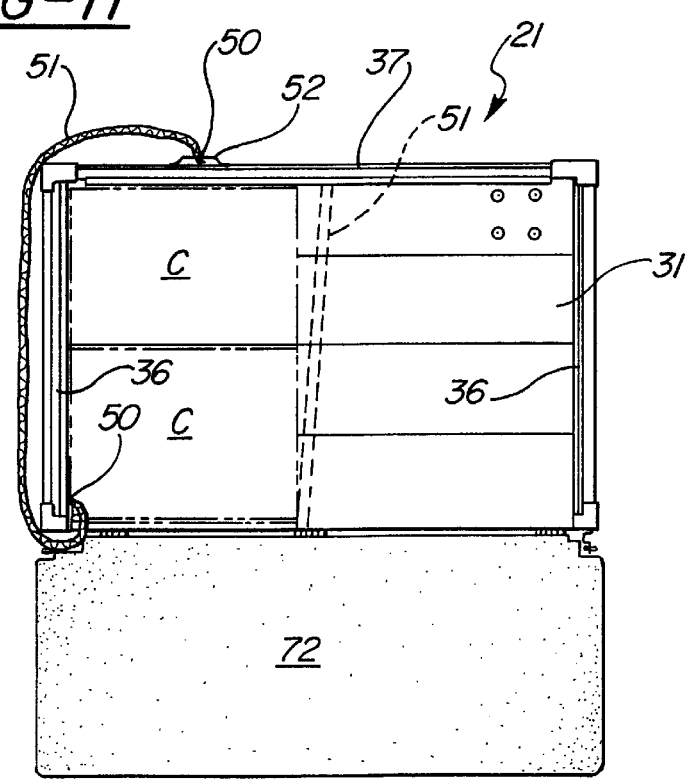
FIG. 11 is a top plan view like FIG. 6 but showing a cargo retention tarp in its use and stowed positions.

When loading the palleted containers C into the carts 21, it is desirable to have the curtain 51 positioned clear of the open front 38 of the cart 21 so as not to interfere with loading. As shown in FIGS. 3 and 11, the back panel 37 of the cart 21 is fitted with the keeper bracket 52 on the exterior side thereof in position to receive and releasibly retain the upper end clip 50 of the curtain 51 when not in use. As illustrated diagrammatically in FIG. 11, extending the curtain 51 exteriorly of the cart 21 around to the back of the cart 21 enables the end clip 50 to be secured in the keeper 52 to support the curtain 51 clear of the open front 38 during loading.

Figure 4:
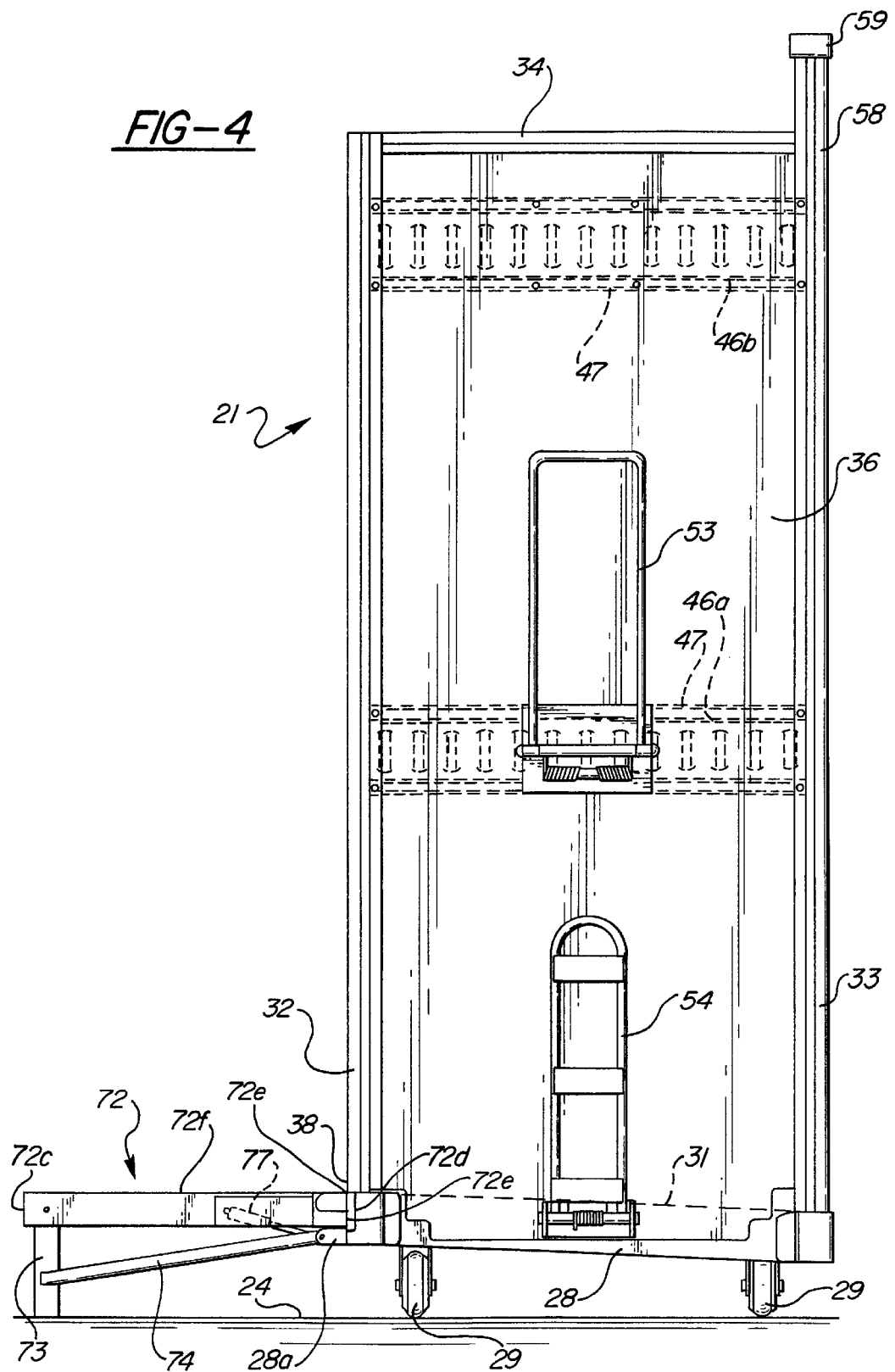
FIG. 4 is an elevational view of a leading side of the cart of FIG. 3.

As shown best in FIG. 4, the leading side of the cart 21 is fitted with an upper pull handle 53 and lower tow bar 54 which are shown spring biased to a stowed position against the side panel 36, but which are swingable outwardly of the side panel 36 to an extended position to facilitate handling of the cart 21. As shown in FIG. 5, the trailing side of the cart 21 is fitted with a hitch pin 55 projecting downwardly from the base frame 28 and operative to receive and releasibly retain the tow bar 54 of another cart to enable a number of the carts 21 to be trained together for transport.

In use, a plurality of the carts 21, located at a manufacturing or distribution center, are loaded with one or more mini-stacks of the containers C according to the brand and quantity called for by the particular retail orders to be delivered on a delivery route. The illustrated carts 21 are designed to hold four such mini-stacks of containers C two deep and two wide within the bay of each cart 21 as illustrated in FIG. 2. In this way, each order is pre-assembled on the mini-pallets P and loaded onto the carts 21 in preparation for delivery to the retail sites. The location of each order is recorded such that an order might be contained in cart 4, pallet 2, for example. The carts 21 are equipped with a clip board B (FIG. 3) secured thereto, with alligator clip "a", for holding written records.

Once loaded, the carts 21 are wheeled into the trailer 22 and positioned end-to-end along the side walls 23 forming the two long rows $R_1$, $R_2$ of carts, as illustrated best in FIG. 2. The front-to-back depth of the carts 21 is dimensioned to leave space between the cart rows $R_1$, $R_2$ to define the center walkway or aisle A extending the length of the trailer 22. It is of sufficient width to accommodate the operator and hand truck 27. The carts 21 are oriented such that their open fronts 38 face the aisle A. In the present example, the carts 21 have a depth of about 29 inches, providing the aisle A formed within a conventional van or enclosed trailer with a width of about 40 inches between the rows $R_1$, $R_2$.

Referring to FIGS. 2 and 14–17, a cart positioning/lock system 56 is provided for properly locating and locking the carts 21 in position within the trailer 22. The system 56 includes a plurality of cart brackets 57, fixed to the van side walls 23 at predetermined locations along the length of the trailer 22, which engage corresponding portions of the carts 21 to locate and secure the carts 21 in position. The locations of the brackets 57 correspond preferably with the locations of the ends of the carts 21 when positioned in their rows $R_1$, $R_2$ along the sides 23 and preferably in relation to the location of upright locking post portions 58 projecting from the back corners of each cart 21. Referring also to FIGS. 4 and 5, the locking posts 58 preferably comprise extended sections of the back corner rails 33 which project above the top rails 34, 35 of the carts 21. The upper ends of the locking posts 58 are each fitted with an enlarged end cap 59 having sides 60 thereof projecting laterally outwardly of the posts 58 and fabricated preferably of a tough, low friction, non-marring material such as polypropylene, polyethylene, glass-filled nylon, or the like. The end caps 59 each have a top wall 61 that extends across the top of the post 58 on which it is mounted and each is formed with an opening or socket 62 therein for purposes to be explained hereinafter.

The brackets 57 are fabricated of a strong, rigid material such as aluminum or structural plastic material, and each has a base portion 63 that is secured by rivets R or the like to the side wall 23, 24 of the trailer 22, and preferably to a cargo track 64 that is fixed to the side wall 23, 24 and extends the length of the trailer in position to mount the brackets 57. The base portions 63 of the brackets 57 support cart-retaining portions 65 which are configured and positioned to retain the locking posts 58 of the carts 21. The cart-retaining bracket portions 65 preferably have generally an L-shaped configuration, including a top wall portion 66 that extends transversely away from the side wall 23 on which the bracket 57 is mounted in a generally horizontal plane above the level of the top posts 58. They further include a forward retaining wall section 67 that projects downwardly from the top wall portion 66 to a level below the free ends of the locking posts 58, and preferably beyond the end caps 59 as best shown in FIGS. 15 and 16. The L-shaped configuration of the cart-retaining portions 65 provides a locking channel 68 that is closed at the top and front by the top wall and retaining wall sections 66, 67, open at the bottom, and open at opposite longitudinal ends 69.

As shown best in FIGS. 14–17, the locking channels 68 are each dimensioned to receive at least one, and preferably two, locking posts 58 of adjacent carts 21 into the channel 68 from the open ends 69 of the brackets 57. The effective lateral depth dimension is selected such that the forward retaining wall section 67 is positioned outwardly of the side wall 23 a distance sufficient to allow the end caps 59 of the locking posts of the carts 21 to pass behind the wall section 67 when the carts 21 are moved along the side wall 23 of the trailer 22 so as to position the locking posts 58 within the channels 68, but yet be fairly close in proximity to the posts 58 to restrict the lateral inward movement of the carts 21. The structure positively locates and retains the carts 21 against the side walls 23 of the trailer 22. It is preferred that the depth of the channels 68 somewhat exceed the minimum spacing requirements such that a limited amount of play exists between the brackets 57 and the posts 58 to account for tolerances and for ease of moving the posts 58 into and out of the channels 68 (e.g., about ½ inch of play). The length dimension of the brackets 57 is selected to be at least as long as, and preferably greater than, the distance between the locking posts 58 of adjacent carts 21 positioned in their rows $R_1$, $R_2$ in substantially end-to-end abutting relationship, as best shown in FIGS. 15 and 17, so as to accommodate both of such locking posts 58 within the same locking channel 68. The center-to-center spacing of the brackets 57 thus equals or closely approximates the end-to-end spacing of the carts 21.

Referring now particularly to FIG. 17, the top wall section 66 of each bracket 57 is formed with an opening 70 that is positioned to align with the socket 62 in the end cap 59 of the aft locking post 58 of each cart 21 (that is, the locking post 58 of each cart nearest the rear end 26 of the trailer 22). A locking pin 71 associated with each bracket 57 is extendable into the aligned openings 70, 62 to lock the carts 21 to the brackets 57 and positively locate and secure the carts 21 longitudinally of the trailer 22. In other words, the carts 22, when locked, are precluded from longitudinal movement in the trailer 22 and are positively located in fixed positions with respect to the other carts 21 within a row and apart from the other row to thereby maintain the width of the aisle A within predetermined limits. The opening 70 in each bracket 57 is preferably elongated in the lateral direction as illustrated in FIG. 17 to permit limited lateral movement of the carts 21.

As the first cart 21 is wheeled into the trailer 22, it is moved toward the front 25 and oriented such that its back corner rails 35 are positioned against one of the side walls 23 of the trailer 22. The leading locking post 58 of the cart 21 is guided into the open aft end 69 (i.e., the end nearest the rear 26 of the trailer) of the locking channel 68 of the fore-most bracket 57 (i.e., the bracket 57 nearest the front wall 25 of the van trailer 22), while at the same time the locking post 58 on the aft or trailing end of the cart 21 is guided into the locking channel 68 of the next adjacent bracket 57 along the wall. Once the first cart 21 is positioned and the top opening 62 of the aft end cap aligned with the opening 70 of the bracket 57, the foremost locking pin 71 is extended through the openings 62, 70 from above to positively position and lock the cart 21 releasably to the bracket 58 in position against the side wall. It is preferred that each locking pin 71 be tethered to the bracket 57 or side wall 25 of the trailer 22 by a lanyard L. Once the initial cart in each row $R_1$, $R_2$ is locked into position, each subsequent cart 21 can be positioned and retained in a similar manner until the rows $R_1$, $R_2$ are completed.

Figure 9:
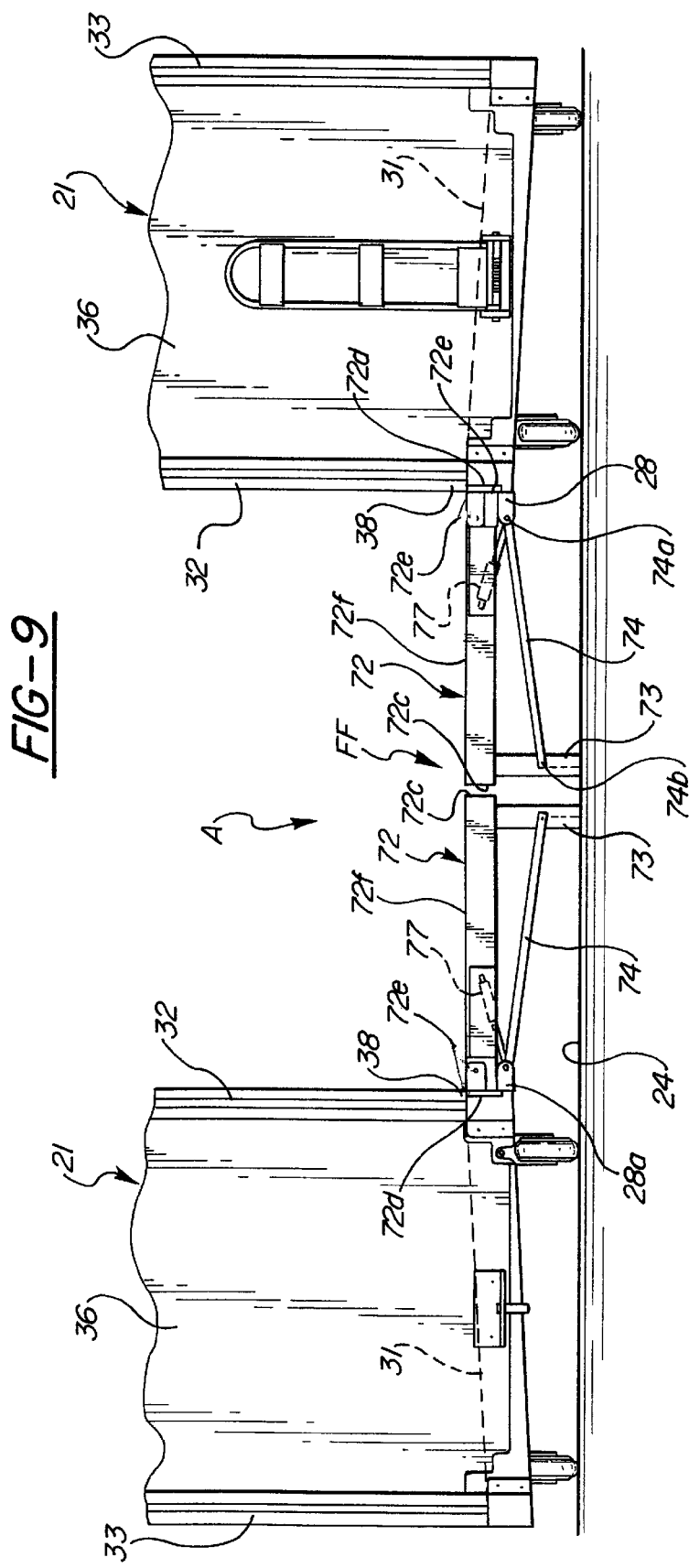
FIG. 9 is an enlarged fragmentary cross-sectional view taken generally along lines 9—9 of FIG. 2.

Referring now to FIG. 9, it will be seen that the floors 31 of the carts 21 are elevated above the level of the floor 24 of the trailer 22 on which the carts 21 are supported. The leading front edge of each cart floor 31 may be, for example, about 7% inches above the floor 24 of the trailer 22. According to the invention, it is desirable to be able to unload the mini-stacks of the containers C from the carts 21 using a two-wheeled hand truck 27. In effecting this, it is further operatively desirable to support the hand truck 27 at generally the level of the cart floors 31 for engaging, lifting and transporting the mini-stacks C with the hand truck 27.

According to the invention, a false elevated floor FF is provided in the aisle A between the rows $R_1$, $R_2$ to provide an upper surface that is substantially level with the almost abutting forward edges of the cart floors 31. While various methods of constructing a false floor FF, such as by laying down overturned pallets or multiple false floor sections in the aisle A are possible, the safest approach is to integrate such false flooring with the beverage carts 21.

Referring to FIGS. 4,5,9, and, 12–13, each cart 21 is provided with a deck section 72 having a generally rectangular platform configuration of predetermined length between opposite ends 72a, 72b thereof and a predetermined width between opposite front and back edges 72c, 72d thereof. The cart deck sections 72 are mounted by pivots or hinges 72e (FIG. 16) along their back upper edges 72d to the front ends of the cart base frames 28. Each deck section 72 is pivotal about the axes of the hinges 72e between an upright, stowed or closed position, illustrated in broken chain lines in FIG. 5, in which the deck section 72 extends along and is generally flush with the front corner rails 32 of the cart 21, and a downwardly pivoted operating position, illustrated in solid lines in FIGS. 4, 5, and 9, in which an upper surface 72f of each deck section 72 is substantially horizontal and level with the forward edge of the cart floor 31 so as to form a horizontal extension of the cart floor 31 forwardly of the cart 21.

With particular attention to FIGS. 5, 12, and 13, the deck sections 72 have support legs 73 mounted pivotally at 73a to the underside of the deck sections 72 adjacent the forward free edges 72c of the deck sections 72. The legs 73 may be referenced singly or multiply as leg structure. The legs 73 are coupled adjacent their lower free ends to forwardly extending brackets 28a, fixed to the base frame 28, by linkages, including rigid, non-foldable links 74, pivoted at their respective front and rear ends to the legs 73 and base frame 28 brackets 28a. The links 74 react to and are moveable with the pivoting movement of the deck sections 72 to position the legs 73 between a retracted position folded beneath and into the deck sections 72 when the deck sections are moved to the stowed position (FIG. 5), and an extended floor-engaging vertical position in response to movement of the deck sections 72 to the horizontal use position (FIG. 5). The links 74 are pivoted at 74a and 74b. It will be seen that the pivots 72e, 74a, 73a, and 74b are arranged in generally parallelogram configuration in FIG. 5 with the pivot or hinge point 72e of the deck to the cart floor being rearward of link pivots 74a.

The deck sections 72 may be fabricated of any of a number of materials such as aluminum decking or various organic polymeric materials, such as polypropylene, polyethylene, an engineered plastic or resin, or glass-filled plastics. The deck sections 72 in the illustrated embodiment are injection molded plastic members, whose upper surface 72f is continuous and preferably molded with traction enhancing features represented by the stippled markings in FIG. 6. The upper surface 72f is backed by structural ribbing 75, as shown in FIGS. 12 and 13, to render the deck sections 72 rigid and capable of supporting the composite weight of an operator, hand truck, and a load of stacked containers C. The underside is preferably formed with recesses 76 of such dimension and location as to accommodate the folding of the legs 73 and the links 74 (FIG. 12) into nested position within the deck section 72 when the deck section is moved to the stowed vertical position.

The deck sections 72 are spring-controlled in their movement between the stowed and use positions by gas springs 77 which bias the decks 72 over-center as the deck sections 72 move to operating position. The springs 77 positively retain or lock the deck sections 72 in both the stowed and use positions (FIG. 5). At least one or more, preferably two, gas springs 77 form part of the linkages or linkage assemblies. The gas springs 77 are of the usual type having a gas-filled cylinder 78 and a piston rod 79 which is extendable and retractable relative to the cylinder 78. The gas springs 77 have a socket coupling 80 at each end (FIG. 12), connected to a laterally extending ball stud 81 provided on each cart on the deck section 72 and on the base frame 28, respectively. The gas springs 77 are of such length and are positioned relative to the hinge axis of each deck section 72 so as to assist an operator in bodily positioning the deck section 72 between the stowed and Z use positions, while moving over-center of the hinge axis as the deck section 72 moves to its extreme positions to provide spring-biased retention of the deck section 70 in the stowed and use positions. The gas springs 77 in the stowed position are accommodated within recesses 77a formed in the underside of the deck sections 72 (FIG. 12).

In operation, once the carts 21 are loaded and locked in their rows $R_1$, $R_2$ within the trailer 22, the deck sections 72 are manually pivoted downwardly to their horizontal use positions in which the automatically outwardly pivoted legs 73 engage the floor 24 of the trailer 22. In the stowed position of decks 72, the gas springs maintain a pressure which must be overcome in order to swing the decks 72 out of the locked position. Because of the leverage resulting from manually pushing the front edge of each deck 72 downwardly, and the weight of the deck itself, little force is needed to compress the gas springs 77 sufficiently to initiate and maintain downward pivoting of the deck section and cause links 74 to move legs 73 from nested position to an extended position in which gas springs 77 bias them downwardly. When the compressing gas springs move past center (i.e. hinge axis 72e) the gas springs exert pressure below the hinge axis 22e so that downward pressure is exerted on the deck 72 and legs 73. This locks or retains the deck in horizontal position. When the deck 72 is to be restored to stowed position, little lifting force is required to extend the gas springs sufficiently to unlock deck 72 and legs 73. As the deck swings up past the hinging axis 72e, the gas springs 77, which were compressed when swung downwardly, assist the upward pivoting movement of deck 72 and the pivoting of legs 73 via links 74 toward nested position. As shown best in FIGS. 2, 9, and 14, the predetermined length and width dimensions of the substantially abutting deck sections 72 are so selected as to provide a near-continuous elevated false floor surface along the aisle A at the same level as the front edge of the floor 31 of the carts 22. While the deck sections 72 of longitudinally adjacent and laterally opposite carts 22 may be sized to substantially abut one another, it is preferred that some play be provided to account for tolerances and variations in the positioning of the carts by the brackets 57. For example, about a ½ to ¾ inch spacing S between the facing sides 72a, 72b and front edges 72c of adjacent deck sections 72 will provide a near-continuous false floor FF while allowing for variations in tolerance and positioning (FIG. 14).

The van trailer 22 is preferably of the type having a back door or doors 82 (FIG. 18) that open to provide access to the interior of the trailer 22. A conventional powered lift gate 83 provided at the unloading dock is movable between an elevated position (FIG. 18) in which an upper surface 84 of the gate is level with the floor 24 of the trailer 22, and a lowered ground-engaging position facilitating the off-loading of cargo from the trailer 22. It will be seen from FIG. 18 that the false floor FF provided by the deck sections 72 is at a level above the upper surface 84 of the lift gate 83 when the latter is in the elevated position.

According to one aspect of the invention, a ramp, generally designated 85, is positioned between the false floor FF and the lift gate 83 to provide a transition between the floor FF and platform of the lift gate 83. The ramp 85 has a body 86 supported on the floor 24 of the trailer 22 adjacent the exposed side edges 87 of the rearward-most deck sections 70 of the carts 21. A pair of upturned hooks 88 are mounted on a forward end of the ramp body 86 and are extendable beneath the exposed side edges 72b of the rearward-most deck sections 72 where they are received in corresponding recesses or sockets 89 provided on the underside of the deck sections 72 for securing the ramp 85 releasably to the false flooring end sections.

The body 86 of the ramp 85 has a sloped support surface 90 that extends from the false floor FF to the upper surface 84 of the lift gate 83. The support surface 90 is preferably segmented to include a fixed section 91 and a hinged section 92 that is moveable about hinge 92a selectively between an extended use position shown in solid lines in FIG. 18 in which the section 92 extends over and is supported on the surface 84 of the lift gate 83, and a stowed position, shown in broken chain lines, in which the section 91 is folded inwardly of the door 82 of van trailer 22 and its fixed section 92, so as to provide clearance for the closing of the back door(s) 82 of the van or trailer 22.

Upon arrival at a point of delivery, the operator simply wheels the hand truck 27 down the aisle A along the elevated false floor FF and selects the cart or carts 22 and location or locations of the mini-stacks of containers C within the cart(s) corresponding to the particular order involved. The hand truck 27 (FIG. 19), except for the nose plate which will be described hereinafter, is of conventional construction and has an upright handled frame 93 mounting a pair of wheels 94 off the back of the frame 93, and a nose plate 95 off the front of the frame 93. A typical hand truck is disclosed in U.S. Pat. No. 3,997,182.

Referring to FIG. 20, the nose plate 95 illustrated has a generally L-shaped profile with a generally horizontal load-supporting platform 96 and an upright back wall 97 fixed to the frame and supporting the platform 96.

To off-load the appropriate mini-stacks of containers C, the operator simply extends the platform 96 of the nose plate 95 beneath the mini-pallet P, which is elevated above the floor 31 of the cart 21 by spaced side feet or rails 98 to provide clearance below the mini-pallet P for the nose plate 95. Once positioned, the operator rocks the hand truck 27 rearwardly to transfer the palleted containers C onto the hand truck 27. The mini-pallets P involved with the present system has, in addition to side feet 98, a downwardly projecting central disc or piloting pad 99 that is generally cylindrical in configuration and engages the floor 31 of the cart 21. The pad 99 is spaced inwardly from the front edge of the mini-pallet P. To accommodate disc 99, platform 96 is provided with a recess or cut-out 100 that extends from a forward edge 101 of the platform 96 inwardly toward the back wall 97 and terminates short of the back wall 97. The curvilinear base 102 of the cut-out 100 conforms in size, shape and location to the circular pad or disc 99 on the mini-pallet P. Such a nose plate 95 enables the mini-pallets P to be fully received and supported on the platform 96 with the pad 99 accommodated within the cut-out 100.

It is preferred also that the cut-out 100 have side walls 103 that converge from the forward edge 101 to the base 102 for piloting the pad 99 into the cut-out 100. A taper of about 5 degrees is preferable. The cut-out 100 gives the platform 96 a generally U-shaped configuration, when viewed in plan as in FIG. 20, which has side portions 104 on either side of the cut-out 100 joined by a flat connecting or bridging plate portion 105 extending behind the cut-out 100 continuously between the side portions 104. The provision of the continuous connecting or bridging plate portion 105 provides the platform 95 with strength and rigidity to prevent it, and particularly the side portions 104, from flexing under load.

Figure 21:
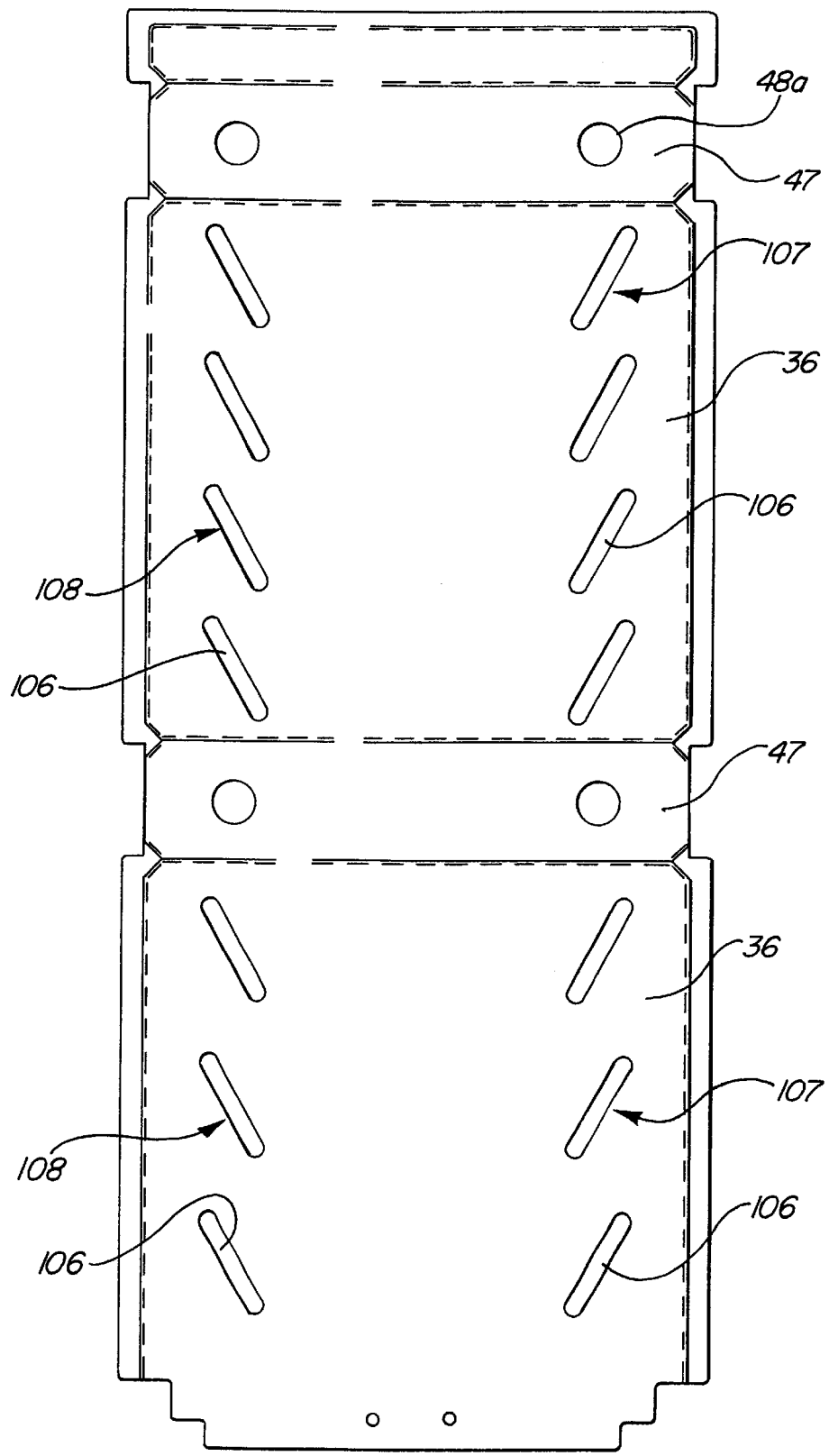
FIG. 21 is an elevational view of a modified cart wall.

In FIG. 21 an alternative side and back wall is modified to provide viewing slots 106 which are provided in two vertical rows 107 and 108 extending along the side edges of the side and back walls 36 and 37, respectively. The through slots 106 are diagonally disposed to enhance their viewing function.

Once the palleted containers C are loaded onto the platform 96 of the hand truck 27, the operator simply wheels the hand truck 27 along the elevated false floor FF toward the open back 26 of the trailer 22, down the ramp 85, and onto the elevated lift gate 83, whereupon the gate 83 is lowered to the ground to permit the containers C to be wheeled into the facility of the retailer or other-receiving party. The process is repeated until the delivery of the order is completed, after which the hand truck 27 is loaded onto the vehicle, the ramp 85 folded to the stowed position, the door(s) of the trailer 22 closed, and the trailer transported to the next delivery site.

Once the trailer 22 has been emptied of product, it is returned to the distribution center where the ramp 85 is detached and removed, the deck sections 70 raised to their stowed positions, and the carts 22 unlocked and removed from the trailer 22 in reverse order for restocking with new product.

The disclosed embodiment is representative of a presently preferred form of the invention, but is intended to be illustrative rather than definitive thereof. The invention is defined in the claims.

We claim:

1. A series of transport carts in combination with a transport vehicle having side walls, a floor, and an openable rear; said series of transport carts being positioned on motive supports in side by side relation in fore to aft extending laterally spaced rows within said van vehicle, said carts having side closures, a rear side, and an open front side facing laterally toward a like cart in an opposite row; said carts also having upwardly projecting rear side lock members with first lock fittings; longitudinally spaced track sections mounted fixedly on said vehicle side walls in spaced relation to receive and capture said lock members on said carts; and second lock fittings associated with said track sections for disengageably interfitting with said first fittings.

2. The cart combination of claim 1 wherein said lock members comprise upwardly projecting rear post portions, and said first fittings comprise sockets for vertically receiving locking pins incorporated with said second lock fittings.

3. The combination of claim 1 wherein said track sections comprise fore to aft extending track parts open at their ends and bottoms to provide inverted capture channels spaced longitudinally along said van vehicle side walls for capturing said upwardly extending cart lock members within said track sections.

4. The combination of claim 1 wherein said cart rear sides have rear posts connected by a rear wall and said lock members comprise upwardly projecting portions of said rear posts which extend above said rear wall, and said track sections are longitudinally spaced along the side walls of said vehicle at intervals to receive said post portions, and comprise a vertical plate portion for attachment to a wall of the vehicle, a mid-portion extending therefrom over said post portions, and a downwardly extending portion overlying said post portions.

5. The combination of claim 4 wherein said first fittings comprise sockets in the upper ends of said post portions and said second fittings comprise lock pins connecting operably with said track parts sections for reception in said post portion sockets.

6. The combination of claim 5 wherein said mid-portions of the track parts sections have openings above said post portion sockets for receiving and passing said lock pins.

7. The combination of claim 1 wherein a clipboard is secured to the rear sides of said carts between said lock members.

* * * * *